United States Patent [19]

Sturm

[11] 4,334,146
[45] Jun. 8, 1982

[54] METHOD AND APPARATUS FOR JOINING THERMOPLASTIC LINE ELEMENTS

[76] Inventor: Werner Sturm, Allerheiligenstr. 624, Hägendorf, Switzerland

[21] Appl. No.: 177,760

[22] PCT Filed: Apr. 26, 1979

[86] PCT No.: PCT/CH79/00059

§ 371 Date: Dec. 28, 1979

§ 102(e) Date: Dec. 11, 1979

[87] PCT Pub. No.: WO79/01000

PCT Pub. Date: Nov. 29, 1979

[30] Foreign Application Priority Data

Apr. 28, 1978 [CH] Switzerland .................. 4696/78

[51] Int. Cl.³ ............................................. H05B 1/02
[52] U.S. Cl. ............................................. 219/492; 219/493; 219/522; 219/544; 219/535; 156/86; 156/273.9; 156/379.7; 264/272.11; 285/286
[58] Field of Search ............... 219/492, 493, 494, 544, 219/522, 535, 203; 156/275, 380; 264/272; 285/286, 292; 323/238, 321, 323

[56] References Cited

U.S. PATENT DOCUMENTS

| | | | |
|---|---|---|---|
| 3,541,429 | 11/1970 | Martin | 323/18 |
| 3,681,569 | 8/1972 | Schwarz | 219/501 |
| 3,943,334 | 3/1976 | Sturm | 219/544 |
| 3,944,893 | 3/1976 | Hayden | 219/203 |
| 4,117,311 | 9/1978 | Sturm | 219/535 |
| 4,176,274 | 11/1979 | Lippera | 219/535 |

*Primary Examiner*—Bruce A. Reynolds
*Assistant Examiner*—Mark H. Paschall
*Attorney, Agent, or Firm*—Roylance, Abrams, Berdo & Farley

[57] ABSTRACT

Electric welding sleeves used more particularly with larger pipe diameters have a heating wire winding which is under compressive stress due to the shrinkage of the sleeve member. This compressive stress and the elongation of the resistance heating wire occurring during the welding process can lead to a lateral displacement and contact with adjacent turns. The welding apparatus (4) used for welding such sleeves obviates these difficulties in that the overall welding time of the electric welding sleeve (15) is subdivided into a preheating time and a welding time. During the preheating time a partial power is used and during the welding time the full welding power. If the welding power is taken from an alternating current system the welding process can start with half the power by arranging a diode (8) in the welding circuit (2) and at the end of the preheating time the diode is bridged by a switching stage (10).

1 Claim, 1 Drawing Figure

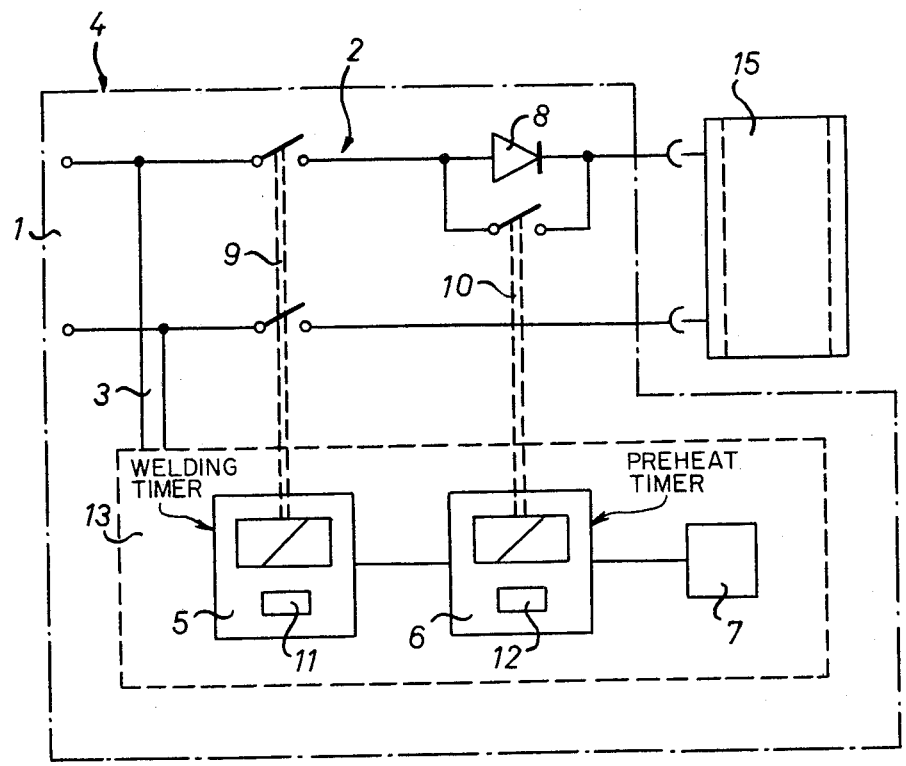

METHOD AND APPARATUS FOR JOINING THERMOPLASTIC LINE ELEMENTS

The invention relates to a method for joining thermoplastic line elements with the aid of a sleeve having a winding of an electrical resistance wire, whereby after connecting to an electric power supply heat is produced in the winding and after supplying a given welding energy the sleeve is welded to the line element, and an apparatus for performing this method.

When joining thermoplastic line elements, i.e. pipe sections, shaped parts and switching means, e.g. valves it is known to supply the welding heat necessary for joining such elements by electrical resistance heating. In this connection it is known to arrange a conductor subject to current action in the vicinity of the connecting surfaces in the connections, e.g. in the sleeve ends or in separate sleeves and by it producing heat the junction is brought into a weldable state. When joining the ends of line elements by sleeves separate therefrom the current-charged conductor is generally a winding of a resistance heating wire, whose turns are spacedly arranged in the vicinity of the inner wall of the sleeve member. When current passes through the winding the inner wall portion of the sleeve and the adjacent parts of the line elements are brought into a fusable state and as a result are welded together, without there being any deformation of the parts, i.e. the ends of the line elements and the sleeve member at the junction. Since the initial use of the sleeves, called electric welding sleeves, their range of use has been constantly widened and nowadays covers all standard diameter ranges. However, it has been found that in the case of larger pipe diameters, e.g. nominal diameters of 160 to 400 millimeters problems occur which have no or little effect with smaller nominal diameters.

Electric welding sleeves for the above-indicated larger nominal diameters are made from a tubular sleeve member, which is initially widened accompanied by the heating thereof in order to give the sleeve member a shrinkage reserve which, triggered off by the welding process at the junction point, brings about the bridging of the clearances between the diameter differences and the pressing of the sleeve member onto the ends of the line elements. The generally monofilar winding is introduced when the sleeve member is in the widened state and is joined to the latter. However, even during storage, i.e. in the cold state there is a certain re-formation of the shrinkage reserve, which is taken into account by a correspondingly greater widening of the sleeve member. The resistance heating wire introduced into the sleeve member consequently undergoes compression stressing during the storage of electric welding sleeves due to the shrinkage of the sleeve member. Since, however, the winding is embedded in the thermoplastic material the individual turns are shortened in accordance with the effective compression stress. If in the making of a welded joint the winding of such a sleeve is charged with electric power the supporting action exerted by the sleeve member material is removed and metallic contact between two adjacent turns may occur.

The elongation of the resistance heating wire caused by the temperature rise during welding and which leads to a considerable elongation thereof has the same effect. The shrinkage reserve of the sleeve member triggered off by the welding heat and the simultaneous elongation of the resistance heating wire lead to the lateral moving apart of the individual turns, because between the turns the thermoplastic material is heated most and is therefore most flowable. As has already been stated the above two factors shrinkage reserve and wire elongation have a greater effect with large nominal diameters and are more likely to cause faults there than in the case of small nominal diameters. Even if the shrinkage occurring during storage could be eliminated by additional expenditure, e.g. by fitting the sleeve to a metallic cylinder which prevents shrinkage, the elongation of the resistance heating wire caused by the heating persists and consequently so does the possibility of short circuiting of adjacent turns, which leads to increased current consumption and to a deterioration in the welded joint.

The problem of the present invention is to so further develop a method of the type indicated hereinbefore that when joining thermoplastic line elements with the aid of an electric welding sleeve there is no contact between the turns of the filament winding.

According to the invention this problem is solved in that the total welding time during which welding energy is supplied to the sleeve is subdivided into two parts with a preheating time and a welding time, and during the preheating time only a fraction of the rated power of the sleeve is produced.

The method according to the invention is carried out by means of an apparatus having an overall timing circuit for metering the welding energy required by the sleeve and a preheating timing circuit which, after the preheating time has ended, switches over the apparatus to the rated welding power, whilst the overall timing circuit interrupts the circuit connecting the sleeve to the mains after the welding energy supply has taken place.

The invention is described hereinafter relative to an embodiment and the attached drawing. The drawing diagrammatically shows a welding apparatus for performing the method of the invention.

The drawing shows a mains supply 1, which serves to connect a welding apparatus 4 for producing joints on thermoplastic line elements by means of an electric welding sleeve 15, connected by means of a welding circuit 2 to the mains supply 1.

A supply line 3 branches off from the welding circuit 2 to a not shown mains part by which a low voltage is produced for supplying regulating, control and measuring means 13 for apparatus 4. Welding apparatus 4 can be a known electric welding apparatus, which meters the thermal energy for the electric welding sleeve 15 and specifically e.g. by means of a current control with timing circuit (Swiss Pat. No. 398 957) or a controlled current/time integrator (Swiss Pat. No. 523 130).

As can be gathered from the drawing the electric welding apparatus has two timing circuits, an overall timing circuit 5 which meters the thermal energy to be supplied to the electric welding sleeve 15 and which after reaching the nominal value interrupts the welding circuit 2 by a switching stage 9, and an additional timing circuit, called the preheating timing circuit 6, which after a time called the preheating time bridges a diode 8 in the welding circuit 2 with a switching stage 10. The diode and switch, connected in parallel, forms a power level selecting arrangement. As a result of this arrangement it is possible to offer the electric welding sleeve 15 a smaller voltage during the preheating time, so that the heating wire temperature is only slightly above that of the melting point of the thermoplastic material of the sleeve member. If it is assumed that the welding power is taken from the public mains, the welding process takes place with half the power during the preheating time.

Due to the fact that during the preheating time only a partial power is available for heating the electric welding sleeve 15 the elongation of the heating wire is correspondingly smaller. Due to the slower heating during the preheating time the flowability of the material surrounding the heating wire winding is more uniform, so that the turns thereof can expand radially. The release of the shrinkage reserve of the sleeve member also takes place more slowly, so that the heating of the thermoplastic material and the shrinkage of the sleeve member takes place so slowly that the individual turns of the heating wire winding only expands radially and not laterally.

The total welding time necessary for producing a joint by means of an electric welding sleeve consequently comprises the preheating time and the actual welding time. The preheating time is appropriately determined by means of a counter with a warning signal. On reaching the signal the diode 8 connected in front of the electric welding sleeve 15 is bridged by the switching stage 10.

Apparatus 4 is put into operation by a starting circuit 7, which switches on the switching stage 9 via the overall timing circuit 5, so that the preheating time commences. On reaching the warning signal of the preheating timing circuit diode 8 is bridged and the welding time starts. At the end of the latter the overall timing circuit 5 interrupts welding circuit 2 with the aid of switching stage 9. By means of e.g. optical indicating means 11, 12 the nature of the operating state is indicated, i.e. preheating and welding.

Thus, the described apparatus 4 makes it possible in a relatively simple manner to effectively solve the problems occurring mainly with larger diameter electric welding sleeves, so that completely satisfactory welded joints are obtained. Preheating times of approximately 1 to 10 minutes can be provided for nominal diameters of 160 to 400 millimeters.

I claim:
1. An apparatus for joining thermoplastic line elements, comprising
a thermoplastic welding sleeve with an electrical resistance heating wire winding disposed therein; and
power control means, electrically coupled to said heating wire winding, for supplying and regulating electrical power to said heating wire winding, said power control means including
a welding circuit coupled to said heating wire winding for conducting electrical power thereto and having a main switch connected in series with said heating wire winding,
an overall timing means, coupled to said main switch, for controlling actuation thereof,
power level selecting means, in said welding circuit in series with said main switch and heating wire winding, for selectively regulating the electrical power supplied to said heating wire winding to either of a rated welding power level or a preheating power level, said power selecting means comprising a diode bridged by a preheating switch connected in parallel with said diode,
a preheating timing means, coupled to said preheating switch, for controlling actuation of said power level selecting means by actuating said preheating switch, and
said overall timing means and said preheating timing means having means for indicating the operating stage of said welding cycle;
whereby said overall timing means and said main switch start and stop a welding cycle of said sleeve by controlling interruptions of said welding circuit, and said preheating timing means and said power level selecting means vary the electrical power during said welding cycle.

* * * * *